Patented Aug. 7, 1928.

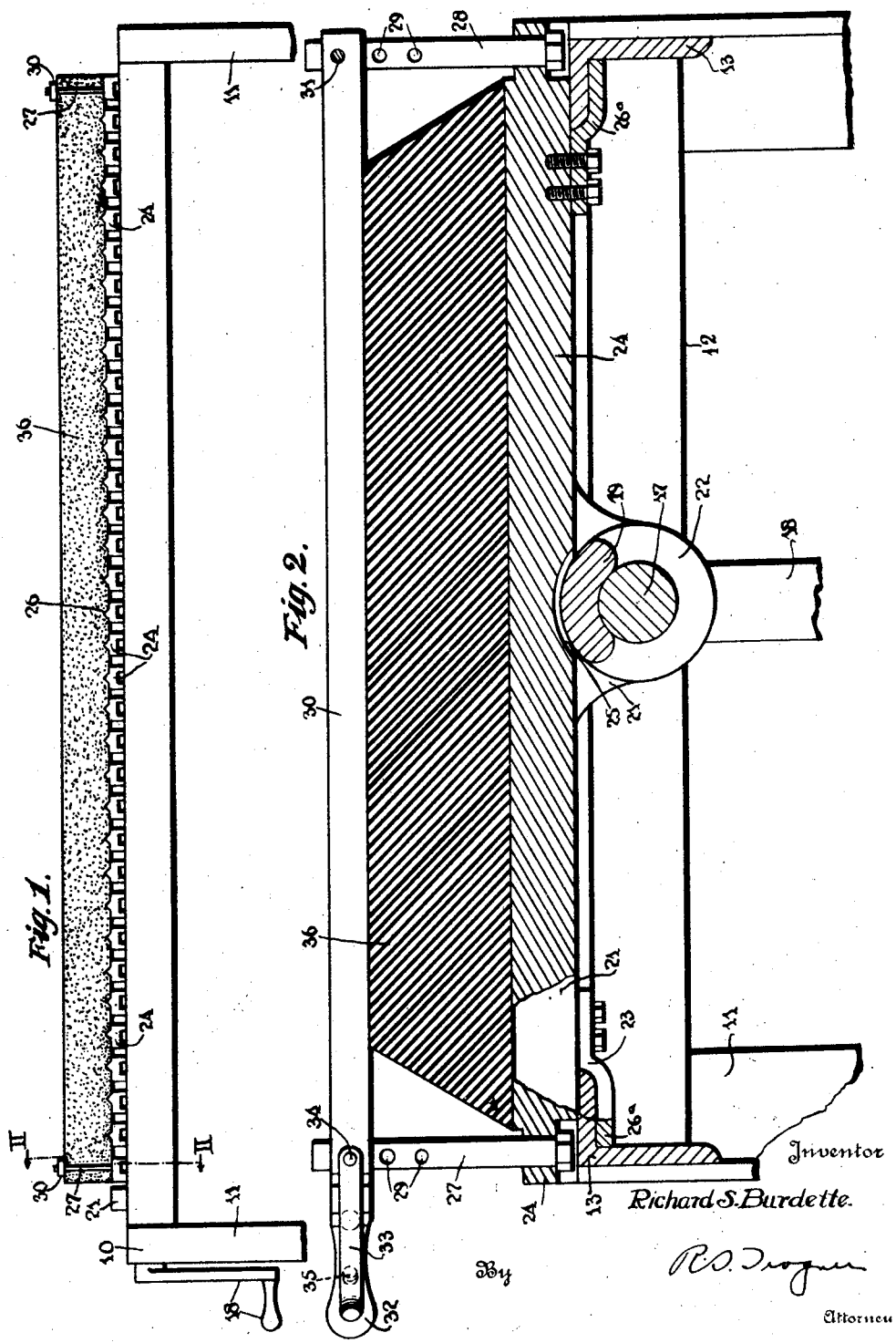

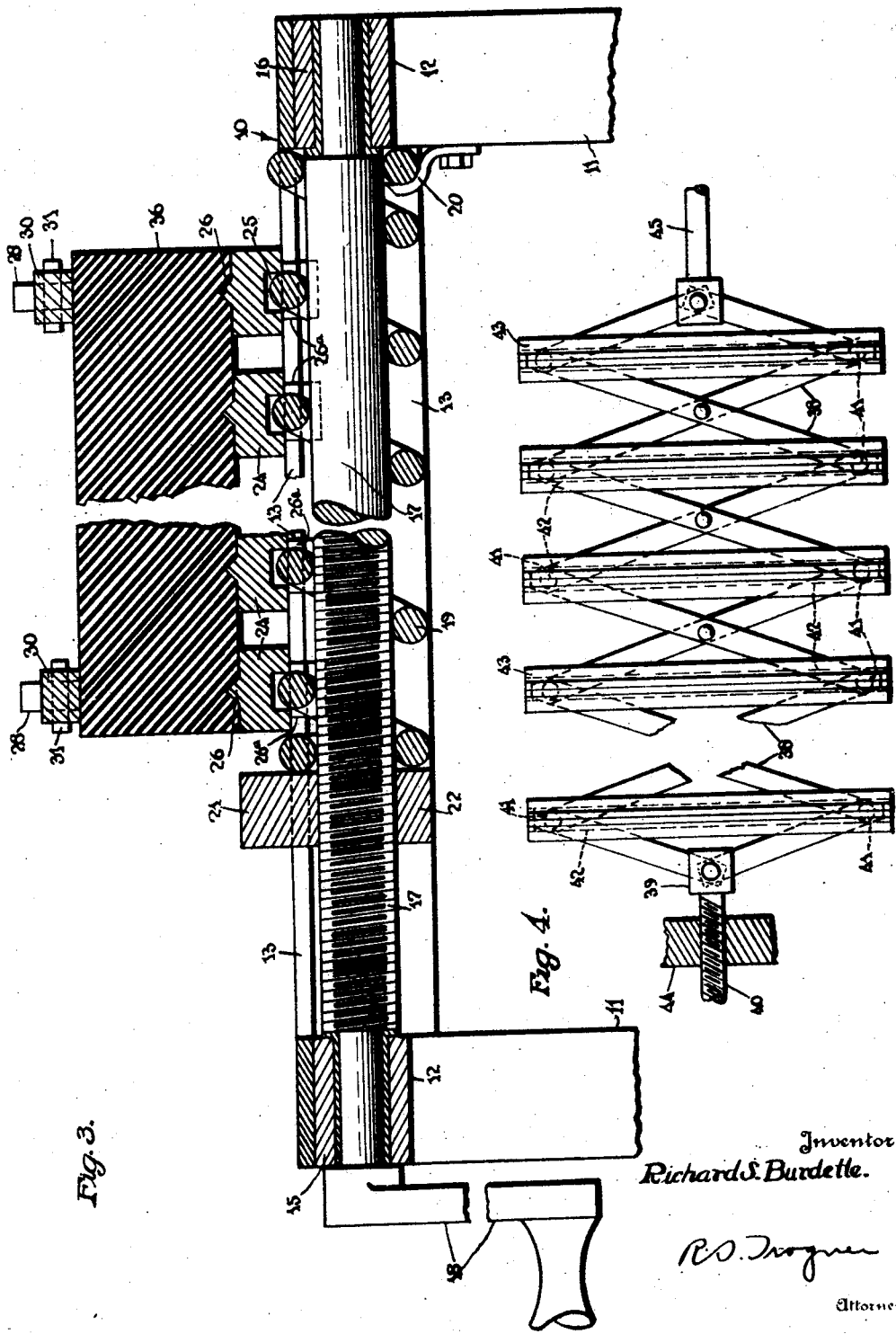

1,679,560

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

METHOD OF AND APPARATUS FOR TREATING SOLID-TIRE MATERIAL.

Application filed September 17, 1927. Serial No. 220,262.

My invention relates to the manufacture of solid tires and it has particular reference to a method of and apparatus for insuring uniformity in the ratio of weight to length of slabs of rubber compound employed in manufacturing such tires.

One object of my invention is to provide a method of producing slabs of solid tire stock wherein a slab of uncured rubber which forms the tire tread is contracted or elongated to its proper length with relation to its weight prior to the vulcanization thereof.

Another object of my invention is to provide an apparatus for regulating the ratio of length to weight of plastic compound extruded from an extruding machine.

It is the usual practice in the manufacture of solid tires to extrude uncured tread stock from a machine, cut the stock to predetermined lengths and weigh it. Oftentimes discrepancies occur between the length and the desired weight and it is necessary either to shorten or lengthen the tread stock in order that it will conform properly to the circumference of the metal base band upon which it is to be mounted. It is to a novel and improved method and means for performing this operation that my invention is directed.

For a better understanding of the invention reference may now be had to the accompanying drawings forming a part of this specification, of which;

Fig. 1 is a side elevational view of the apparatus employed in practising my invention;

Fig. 2 is a cross-sectional view, on a larger scale, taken substantially along the line II—II of Fig. 1 and illustrating the relation between certain parts of the apparatus;

Fig. 3 is a fragmentary cross-sectional view, on a larger scale, showing in detail the principal operating parts of the machine; and Fig. 4 is a fragmentary plan view showing another form of one of the principal elements embodying my invention.

The apparatus embodying the invention comprises a rectangular supporting frame 10 of suitable length, including upright members 11, connecting cross members 12 and angle bars or side members 13. The end or cross members 12 are provided with journal bearings 15 and 16, respectively, which rotatably support a threaded shaft 17 which is rotatable by means of a hand crank 18 secured thereto. A helical spring 19 is disposed spirally about the shaft 17 and is secured at one end to the frame 10 by suitable means, such as a bracket 20. The other end of the spring 19 engages a block 21 formed with a depending lug 22 having a screw-threaded connection to the shaft 17, that provides for the actuation of the block longitudinally of the shaft when the latter is rotated. The spring is normally under compression. The block 21 is prevented from moving laterally by means of brackets 23 secured to its lower side adjacent its ends, which engage and slide along the lower sides of the members 13.

A plurality of blocks 24, similar to the block 21, but having no direct connection to the shaft 17, are provided on their lower faces with grooves 25 which engage the convolutions of the spring 19, and on their upper sides with projections or ridges 26. Brackets 26ª, similar to the brackets 23, are secured to the lower faces of the blocks 24 adjacent the ends thereof and extend below the flange of the angle bars 13. These blocks are adapted to travel slidably upon the guideway or track formed by the side members 13 of the frame. The extreme front and rear blocks are provided with upright members 27 and 28, which are formed with suitably spaced apertures 29. Clamping bars 30 are pivotally connected at their ends to the uprights 28 by means of pins 31, passing through the apertures 29. The opposite or inner end of each bar 30 is provided with a handle 32 and a latching device, preferably comprising a lever 33 pivoted intermediate its ends and mounted adjacent the handle 32. The lever 33 is provided at its outer end with a projecting pin 34, which is adapted to enter one of the apertures 29 on the upright member 27. A suitable tensioning device, such as a spring 35, is provided for maintaining pressure on the lever 33 to cause the pin 34 to be resiliently retained in the aperture.

It will be apparent that upon rotation of the shaft 17 the spring 19 which is under compression will be either compressed or extended according to the direction of rotation of the shaft, and thus the series of blocks 24 will be moved in unison either toward or away from each other. In other words, the space between adjacent blocks will be increased or decreased.

In the practical operation of the apparatus, a solid tire tread 36 of proper weight is disposed upon the blocks 24 and is secured thereon by means of the clamping bars 30 and by the penetration of the projections 26 into the plastic mass of the tread. The deviation from the desired length having been determined, the handle 18 is rotated in the proper direction and the tread stock is uniformly lengthened or contracted as desired, as the blocks 24 are caused to change their relative positions by the extension or compression of the spring 19.

The form of the invention illustrated by Fig. 4 includes a so-called "lazy tongs" device 38 having a block 39 secured at one end thereof in which one end of a screw-threaded shaft 40 is rotatably mounted. This shaft corresponds in function and operation to the shaft 17. The outer pivoted extremities of the "lazy tongs" 38 include upwardly projecting pins 41 disposed within grooves 42 formed in the lower faces of blocks 43, that are substantially the same in construction and function as the blocks 24. A member 44 is actuated upon the shaft 40 in the same manner as the block 21 is actuated upon the shaft 17 and a shaft portion 45 secured to the extremity of the "lazy tongs" 39 opposite the shaft 40 is adapted to be supported in the bearing 16. In this form of my invention, the slab of rubber stock is placed upon the blocks 43 and the member 44 is actuated by rotating the shaft 40 to open or close the "lazy tongs" as desired. Thus the blocks 43 are moved simultaneously toward or away from each other, thereby causing such movement of the stock that it is lengthened or shortened according to the direction of rotation of the shaft 40. The grooves 42 in the blocks permit lateral movement of the pins during the operation of the device.

From the foregoing description it will be apparent that my invention provides a simple, practical and efficient method and apparatus for controlling the length of the solid tire treads with relation to their weight.

Although I have illustrated but the preferred forms which my invention may assume and have described those forms in detail, it will be apparent to those skilled in the art that it is not so limited but that various minor modifications may be made therein without departing from the spirit of the invention or from the scope of the appended claims.

What I claim is:

1. An apparatus for manipulating solid tire stock comprising a plurality of supports for an uncured tread and means for varying the distance between adjacent supports.

2. An apparatus for manipulating solid tire stock comprising a plurality of supports for an uncured tread and means for simultaneously varying the distance between adjacent supports.

3. An apparatus for manipulating solid tire stock comprising common means for supporting an uncured tread and for varying the length thereof.

4. An apparatus for manipulating solid tire stock comprising a plurality of blocks for supporting an uncured tread and means for varying the distance between adjacent blocks.

5. An apparatus for manipulating solid tire stock comprising a plurality of blocks for supporting an uncured tread throughout its length and means for simultaneously varying the distance between adjacent blocks.

6. An apparatus for manipulating solid tire stock comprising a plurality of supports, means for securing an uncured tread thereon at spaced points throughout its length and means for simultaneously varying the distance between adjacent supports.

7. An apparatus for manipulating solid tire stock comprising a supporting frame having a shaft rotatably mounted thereon, a helical spring encircling the shaft, a plurality of slidably mounted blocks formed with grooves on one side thereof adapted to engage the convolutions of the spring and means for varying the tension of the spring by rotation of the shaft.

8. An apparatus for manipulating solid tire stock comprising a supporting frame having a screw-threaded shaft rotatably mounted thereon, a helical spring encircling the shaft and secured at one end to the frame, a plurality of slidably mounted blocks having grooves therein adapted to engage the convolutions of the spring, a block having screw-threaded connection with the shaft and bearing against the free end of the spring and means for rotating the shaft to vary the tension of the spring.

9. The method of varying the length of freshly extruded solid tire treads that comprises subjecting relatively short portions of the tread to uniform tension or compression.

10. The method of varying the length of freshly extruded solid tire treads that comprises subjecting relatively short portions of the tread to uniform tension.

11. The method of varying the length of freshly extruded solid tire treads that comprises subjecting relatively short portions of the tread to uniform compression.

12. The method of varying the length of freshly extruded solid tire treads that comprises placing the tread on a plurality of relatively displaceable supports and causing movement of the supports to produce equal increments of strain to the sections between adjacent supports.

13. The method of varying the length of freshly extruded solid tire treads that comprises supporting the tread at a plurality of substantially equidistant points and causing simultaneous relative movement between the points of support.

14. The method of varying the length of freshly extruded solid tire treads that comprises securing the tread on a plurality of relatively movable supports and causing simultaneous movement of the supports to produce equal increments of strain to the sections between adjacent supports.

In witness whereof, I have hereunto signed my name at Akron, in the county of Summit, and State of Ohio, this 16th day of September, 1927.

RICHARD S. BURDETTE.